(12) United States Patent
Malladi et al.

(10) Patent No.: US 7,085,317 B2
(45) Date of Patent: Aug. 1, 2006

(54) COMMUNICATION RECEIVER WITH AN ADAPTIVE EQUALIZER LENGTH

(75) Inventors: Durga Prasad Malladi, San Diego, CA (US); Josef Blanz, Munich (DE); Yongbin Wei, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 213 days.

(21) Appl. No.: 10/369,287

(22) Filed: Feb. 18, 2003

(65) Prior Publication Data

US 2004/0161029 A1    Aug. 19, 2004

(51) Int. Cl.
*H03H 7/30* (2006.01)
*H04B 1/10* (2006.01)
(52) U.S. Cl. .................. 375/232; 375/152; 375/350
(58) Field of Classification Search ........ 375/141–143, 375/146, 147, 150, 152, 232, 343, 346, 350; 370/290; 708/322, 223, 420, 426
See application file for complete search history.

(56) References Cited

U.S. PATENT DOCUMENTS

| 5,101,501 A | 3/1992 | Gilhousen et al. |
| 5,636,244 A * | 6/1997 | Goodson et al. ............ 375/231 |
| 6,466,616 B1 | 10/2002 | Stenström et al. |
| 2002/0012391 A1 | 1/2002 | Ahn |
| 2003/0133424 A1* | 7/2003 | Liang et al. ................ 370/335 |

FOREIGN PATENT DOCUMENTS

EP          1 182 836        2/2002

* cited by examiner

*Primary Examiner*—Young T. Tse
(74) *Attorney, Agent, or Firm*—Philip Wadsworth; Sandra L. Godsey

(57) ABSTRACT

In a communication system, a method for estimating a transmitted signal is disclosed. A communication signal is received. A delay-power analyzer analyzes the communication signal. A delay spread is then estimated from information obtained from the delay-power analyzer. A new equalizer filter length is determined based on the estimated delay spread. An equalizer is configured to use the new equalizer filter length.

34 Claims, 12 Drawing Sheets

COMMUNICATION RECEIVER WITH AN ADAPTIVE EQUALIZER LENGTH

REFERENCE TO CO-PENDING APPLICATIONS FOR PATENT

The present Application for Patent is related to the following co-pending U.S. Patent Applications:

"Communication Receiver with an Adaptive Equalizer"by Yongbin Wei, Durga Malladi, and Josef Blanz, having U.S. application Ser. No. 10/368,920, filed on Feb. 18, 2003, assigned to the assignee hereof, and expressly incorporated by reference herein;

"Communication Receiver with an Adaptive Equalizer That Uses Channel Estimation"by Durga Malladi, Josef Blanz and Yongbin Wei, having U.S. application Ser. No. 10/368,891, filed on Feb. 18, 2003, assigned to the assignee hereof, and expressly incorporated by reference herein;

"Communication Receiver with an Adaptive Equalizer and a Rake Receiver With Channel Estimation"by Durga Malladi, Josef Blanz and Yongbin Wei, having U.S. application Ser. No. 10/368,829, filed on Feb. 18, 2003, assigned to the assignee hereof, and expressly incorporated by reference herein;

"Systems And Methods For Improving Channel Estimation"by Durga Malladi, Josef Blanz and Yongbin Wel, having U.S. application Ser. No. 10/368,765, filed on Feb. 18, 2003, assigned to the assignee hereof, and expressly incorporated by reference herein.

BACKGROUND

1. Field

The present invention relates generally to equalization in communications systems, and more specifically, to an equalizer with an adaptively adjusting equalizer length for use with wireless communication systems.

2. Background

Communications systems are used for transmission of information from one device to another. Prior to transmission, information is encoded into a format suitable for transmission over a communication channel. The transmitted signal is distorted as it travels through the communication channel; the signal also experiences degradation from noise and interference picked up during transmission.

One effect that creates signal distortion is multipath propagation. Multipath signals are different versions of the same wireless signal that are generated by reflections from structures and natural formations. Multipath signals may have phase shifts that cause the signals to cancel each other out at certain locations. The loss of a signal due to the phase cancellation of multipath signals is known as fading. Fading is a problem in wireless systems because it disrupts user communications. For example, several multipath copies of a single wireless signal transmitted by a wireless communications device may be generated by reflections from trees and buildings. These multipath copies may combine and cancel each other out due to phase offset.

Another issue that may affect a signal is an inadequate signal-to-noise ratio. The signal-to-noise ratio ("SNR") represents the power of a signal relative to the surrounding noise. An adequate SNR needs to be maintained so that the signal may be separated from the noise.

An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. The dispersive nature of the channel is a consequence of multipath propagation. The received signal is decoded and translated into the original pre-encoded form. Both the transmitter and receiver are designed to minimize the effects of channel imperfections and interference.

Various receiver designs may be implemented to compensate for noise and interference caused by the transmitter and the channel. By way of example, an equalizer is a common choice for dealing with multipath, ISI and for improving the SNR. An equalizer corrects for distortions and generates an estimate of the transmitted symbol. In the wireless environment, equalizers are required to handle time-varying channel conditions. Ideally, the response of the equalizer adjusts to changes in channel characteristics. The ability of the equalizer to respond to changing conditions is related to the number of taps of the equalizer. More taps allow the equalizer to more accurately adjust to changes, while fewer taps allow faster adaptation. Optimizing the equalizer by selecting the number of taps is difficult, as this requires a balancing of competing goals.

A need exists, therefore, for an equalizer design that optimizes performance for a variety of systems and conditions.

DETAILED DESCRIPTION

Figure 1:
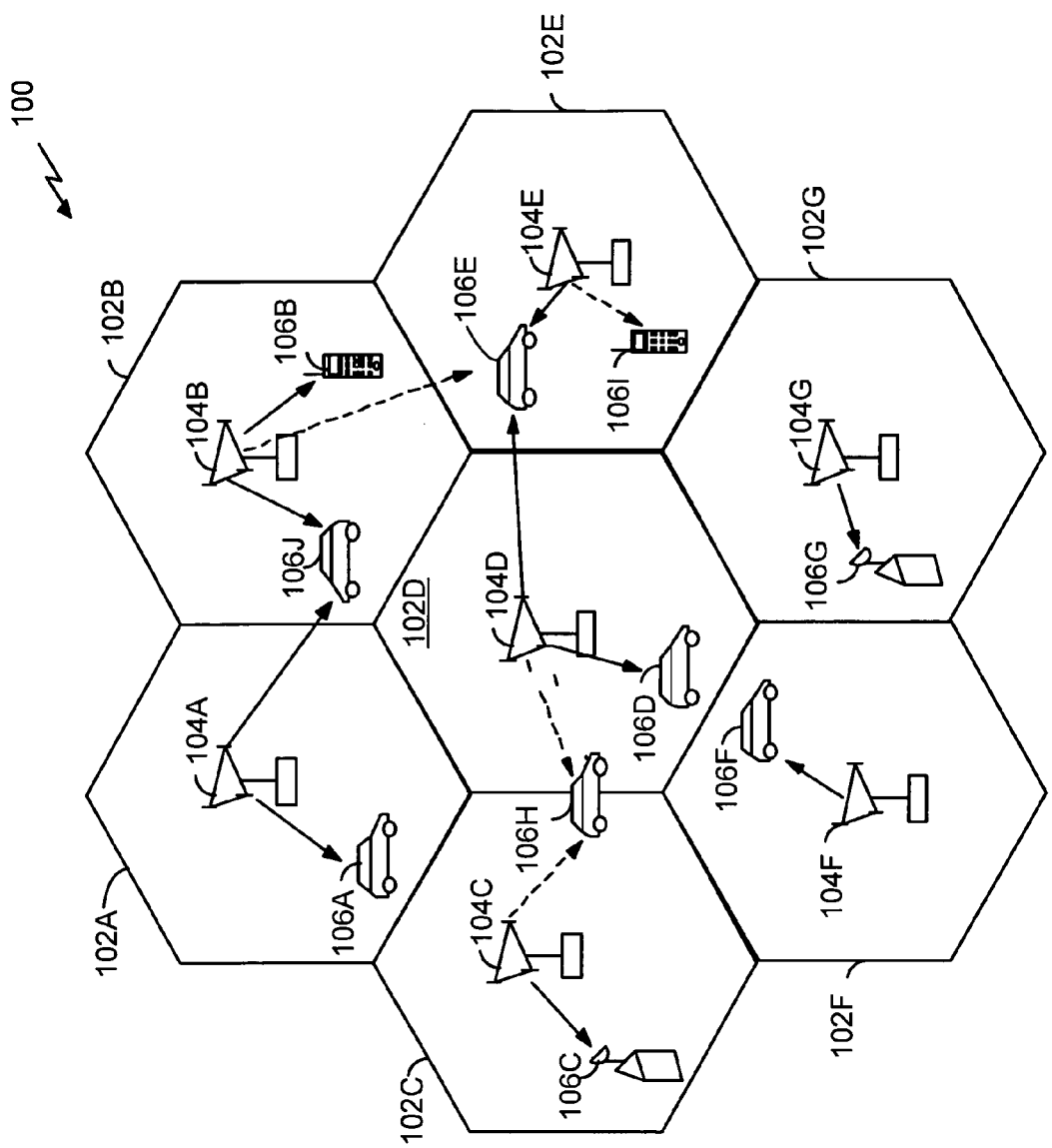
FIG. 1 is a diagram of a spread spectrum communication system that supports a number of users.

In a communication system, a method for estimating a transmitted signal is disclosed. A communication signal is received. A delay-power analyzer analyzes the communication signal. A delay spread is then estimated from information obtained from the delay-power analyzer. A new equalizer filter length is determined based on the estimated delay spread. An equalizer is configured to use the new equalizer filter length.

The equalizer may include a filter having a maximum length and a used length. The used length is typically less than or equal to the maximum length. The equalizer may be configured to use the new equalizer filter length by setting the used length to the new equalizer filter length. The equalizer may be an adaptive equalizer.

The information obtained from the delay-power analyzer may include various kinds of information. The information may include energy-based information, timing-based information and/or SNR-based information.

The method disclosed may also use a threshold value to update the filter length. A difference may be computed between the used length and the new equalizer filter length. The equalizer may be configured to use the new equalizer filter length if the difference passes the threshold value.

The method may be embodied in various systems. For example, the method may be implemented by a mobile station or by a base station.

A mobile station for use in a wireless communication system is also disclosed. The mobile station includes an equalizer for estimating a transmitted signal. The mobile station includes at least one antenna for receiving a wireless signal and a receiver in electronic communication with the antenna. An equalizer estimates a transmitted signal. The equalizer includes a plurality of taps, a maximum length and a used length. The maximum length defines a total number of taps. The used length defines a number of taps being used and is adaptive. The used length is adaptive through use of a method. A delay spread is estimated from information obtained from a delay-power analyzer. Then a new equalizer filter length is determined based on the delay spread.

The components of the mobile station are also applicable and may be used with other receiving systems. An apparatus is also generally disclosed for use in a wireless communication system that includes an equalizer for estimating a transmitted signal. The apparatus may be embodied in a mobile station, in a base station, or in any other system that needs to receive and process a wireless signal.

The systems and methods disclosed herein may be used to compensate for multipath propagation. Multipath signals are different versions of the same wireless signal that are generated by reflections from structures and natural formations. Multipath signals may have phase shifts that cause the signals to cancel each other out at certain locations. The loss of a signal due to the phase cancellation of multipath signals is known as fading. Fading is a problem in wireless systems because it disrupts user communications. For example, several multipath copies of a single wireless signal transmitted by a wireless communications device may be generated by reflections from trees and buildings. These multipath copies may combine and cancel each other out due to phase offset.

The systems and methods disclosed herein may also be helpful in optimizing the power used in a communication system. CDMA systems benefit from using power control. An adequate SNR must be maintained so that the signal may be separated from the noise. Since CDMA signals are not divided by frequency or time for a given link direction, the noise component of the ratio includes all other received CDMA signals. If the power of an individual CDMA signal is too high, it effectively drowns out all other CDMA signals. Power control is used on the uplink (transmission from the terminal to the base station) and on the downlink (transmission from the base station to the terminal). On the uplink, power control is used to maintain an appropriate power level for all user signals received at the base station. The power level of these received CDMA signals should be minimized, but still must be strong enough to maintain the appropriate SNR. On the downlink, power control is used to maintain an appropriate power level for all signals received at the various terminals. This minimizes interference between users in the same cell due to multipath signals. This also minimizes interference between users in adjacent cells. CDMA systems dynamically control the transmit power of the base station and the terminals to maintain the appropriate power level on the uplink and the downlink. Dynamic control is applied through open loop and closed loop control techniques that are known in the industry.

The range of the CDMA system is directly related to the common power level of the received signals because each additional signal adds noise to all of the other signals. The user noise component of the SNR is reduced when the average receive power level is lowered. Techniques that decrease CDMA signal power from the communications device directly increase the range of the CDMA system. Receive diversity is one technique used to minimize the required signal power. Lower signal power also lowers the cost of the user communications devices while increasing operational battery life as well as the range. Optimizing the power used may have additional benefits in high data rate systems where high data rates might only be supported if an appropriate SNR may be reached.

Communications systems are used for transmission of information from one device to another. Before transmission, information is encoded into a format suitable for transmission over a communication channel. The communication channel may be a transmission line or free space between the transmitter and the receiver. As the signal propagates through the channel, the transmitted signal is distorted by imperfections in the channel. Furthermore, the signal experiences degradation from noise and interference picked up during transmission. An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. The dispersive nature of the channel is a consequence of multipath propagation. At the receiver, the signal is processed and translated into the original pre-encoded form. Both the transmitter and receiver are designed to minimize the effects of channel imperfections and interference.

Various receiver designs may be implemented to compensate for interference and noise caused by the transmitter and the channel. By way of example, an equalizer is a common choice for dealing with these problems. An equalizer may be implemented with a transversal filter, i.e. a delay line with T-second taps (where T is the time resolution of the equalizer filter). The contents of the taps are weighted and summed to generate an estimate of the transmitted signal. The tap coefficients are adjusted to compensate for changes in the radio channel. Commonly, an adaptive equalization technique is employed whereby the tap coefficients are continually and automatically adjusted. The adaptive equalizer uses a prescribed algorithm, such as Least Mean Square (LMS) or Recursive Least Squares (RLS), to determine the tap coefficients. The signal is coupled to a channel separation device such as a descrambler/despreader and to a decision-making device such as a decoder or a symbol slicer.

The ability of a receiver to detect a signal in the presence of noise is based on the ratio of the received signal power and the noise power, commonly known as the SNR or the carrier-to-interference ratio (C/I). Industry usage of these terms, or similar terms, is often interchangeable, however, the meaning is the same. Accordingly, any reference to C/I herein will be understood by those skilled in the art to encompass the broad concept of measuring the effects of noise at various points in the communications system.

Equalizers in wireless communication systems are designed to adjust to time-varying channel conditions. As the channel characteristics change, the equalizer adjusts its response accordingly. Such changes may include variations in the propagation medium or the relative motion of the transmitter and receiver, as well as other conditions. As discussed hereinabove, adaptive filtering algorithms are often used to modify the equalizer tap coefficients. Equalizers that employ adaptive algorithms are generally referred to as adaptive equalizers. Adaptive algorithms share a common property: adaptation speed decreases as the number of equalizer taps increases. Slow adaptation impacts the tracking behavior of adaptive equalizers. A "long" equalizer, i.e., an equalizer having a large number of taps, is desirable as long equalizers more accurately invert channel distortions resulting in good steady state performance. Long equalizers, however, react more slowly to channel variations leading to poor transient behavior, i.e., poor performance when the channel is rapidly varying. An optimum number of taps balances such considerations and compromises between good steady-state performance and good transient performance.

In practice, determining the optimum number of taps is difficult as the optima depends on a variety of conditions and goals, including but not limited to, the instantaneous response of the channel, and the rate of variation of the channel. So it is difficult to determine, a priori, the optimum number of taps if the equalizer is to be used on a variety of channels, in a variety of time-varying conditions.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of a communication receiver with an adaptive equalizer by first discussing a spread-spectrum wireless communication system. A base station and a mobile station, as well as the communications sent therebetween, are then discussed. Then components of an embodiment of a subscriber unit are shown. Functional block diagrams are shown and described in relation to the transmission and reception of a wireless signal. Details regarding an equalizer and an equalizer settings adjuster in the receiving system are also set forth. Included in the specification relating to the signal processing are illustrations and mathematical derivations. The process for using the equalizer and adapting the internal settings of the equalizer is then discussed.

Note that the exemplary embodiment is provided as an exemplar throughout this discussion; however, alternate embodiments may incorporate various aspects without departing from the scope of the present invention. Specifically, the present invention is applicable to a data processing system, a communication system, a mobile IP network and any other system desiring to receive and process a communication signal.

The exemplary embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard.

The systems and methods described herein may be used with high data rate communication systems. Throughout the following discussion a specific high data rate system is described for clarity. Alternate systems may be implemented that provide transmission of information at high data rates. For CDMA communications systems designed to transmit at higher data rates, such as a High Data Rate (HDR) communications system, a variable data rate request scheme may be used to communicate at the maximum data rate that the C/I may support. The HDR communications system is typically designed to conform to one or more standards such as the "cdma2000 High Rate Packet Data Air Interface Specification," 3GPP2 C.S0024, Version 2, Oct. 27, 2000, promulgated by the consortium "$3^{rd}$ Generation Partnership Project 2." The contents of the aforementioned standard is incorporated by reference herein.

A receiver in an exemplary HDR communications system may employ a variable rate data request scheme. The receiver may be embodied in a subscriber station in communication with a land-based data network by transmitting data on an uplink to a base station (shown below). The base station receives the data and routes the data through a base station controller (BSC) (not shown) to the land-based network. Conversely, communications to the subscriber station may be routed from the land-based network to the base station via the BSC and transmitted from the base station to the subscriber unit on a downlink.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A–102G, each of which is serviced by a corresponding base station 104A–104G, respectively. In the exemplary embodiment, some of the base stations 104 have multiple receive antennas and others have only one receive antenna. Similarly, some of the base stations 104 have multiple transmit antennas, and others have single transmit antennas.

There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
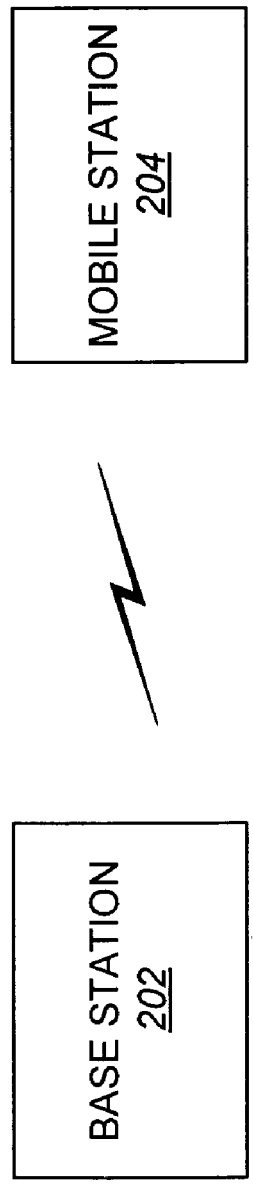
FIG. 2 is a block diagram of a base station and a mobile station in a communications system.

FIG. 2 is a block diagram of the base station 202 and mobile station 204 in a communications system 100. The base station 202 is in wireless communication with the mobile station 204. As mentioned above, the base station 202 transmits signals to mobile stations 204 that receive the signals. In addition, mobile stations 204 may also transmit signals to the base station 202.

Figure 3:
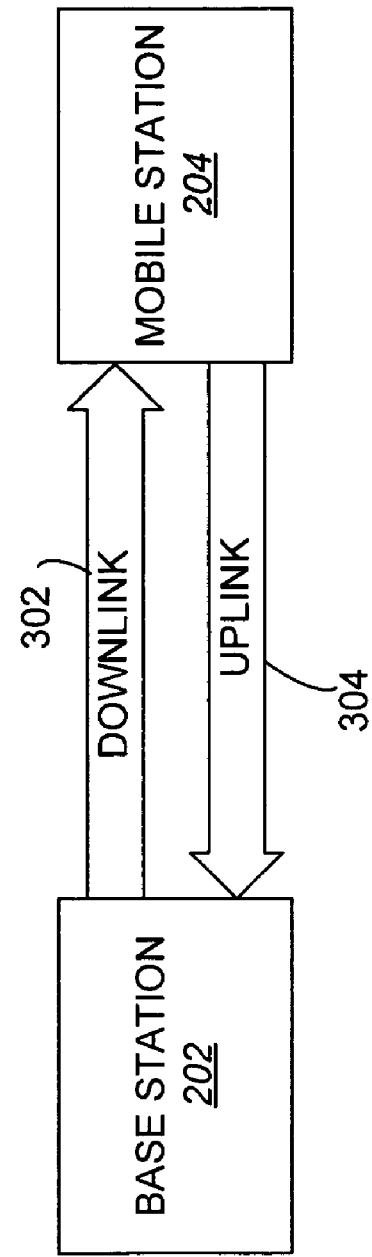
FIG. 3 is a block diagram illustrating the downlink and the uplink between the base station and the mobile station.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

Figure 4:
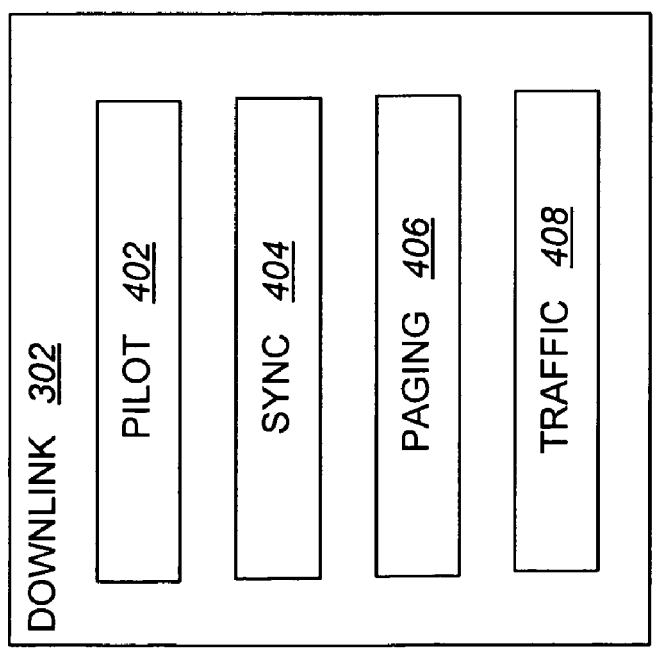
FIG. 4 is a block diagram of the channels in an embodiment of the downlink.

FIG. 4 is a block diagram of the channels in an embodiment of the downlink 302. The downlink 302 includes the pilot channel 402, the sync channel 404, the paging channel 406 and the traffic channel 408. The downlink 302 illustrated is only one possible embodiment of a downlink 302, and it will be appreciated that other channels may be added or removed from the downlink 302.

Under one CDMA standard, described in the Telecommunications Industry Association's TIA/EIA/IS-95-A Mobile Stations-Base Station Compatibility Standard for Dual-Mode Wideband Spread Spectrum Cellular System, each base station 202 transmits pilot 402, sync 404, paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202 to determine when to hand off between base stations 202 (such as when moving between cells 102).

The sync channel 404 conveys timing and system configuration information to the mobile station 204. The paging channel 406 is used to communicate with mobile stations 204 when they are not assigned to a traffic channel 408. The paging channel 406 is used to convey pages, that is, notifications of incoming calls, to the mobile stations 204. The traffic channel 408 is used to transmit user data and voice. Signaling messages are also sent over the traffic channel 408.

Figure 5:
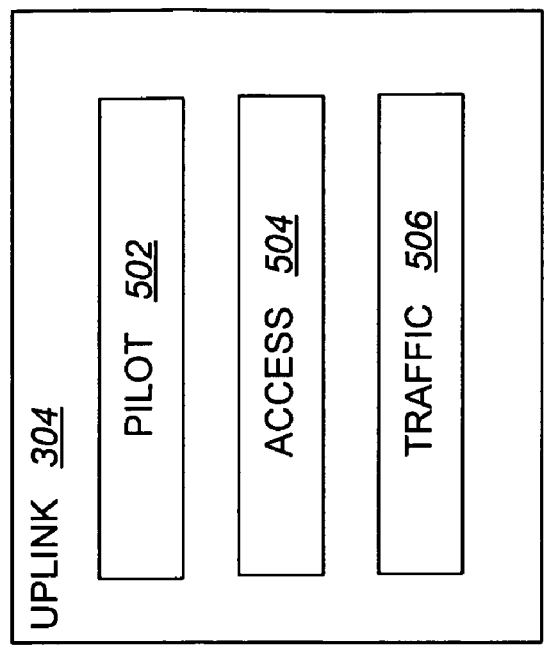
FIG. 5 is a block diagram of the channels in an embodiment of the uplink.

FIG. 5 is a block diagram of the channels in an embodiment of the uplink 304. The uplink 304 may include a pilot channel 502, an access channel 504 and a traffic channel 506. The uplink 304 illustrated is only one possible embodiment of an uplink and it will be appreciated that other channels may be added or removed from the uplink 304.

The uplink 304 of FIG. 5 includes a pilot channel 502. Recall that third-generation (3G) wireless radiotelephone communication systems have been proposed in which an uplink 304 pilot channel 502 is used. For example, in the currently proposed cdma2000 standard, the mobile station 204 transmits a Reverse Link Pilot Channel (R-PICH) that the base station 202 uses for initial acquisition, time tracking, rake-receiver coherent reference recovery, and power control measurements. Thus, systems and methods herein are applicable to pilot signals on the downlink 302, and on the uplink 304.

The access channel 504 is used by the mobile station 204 to communicate with the base station 202 when the mobile 204 does not have a traffic channel 506 assigned. The uplink traffic channel 506 is used to transmit user data and voice. Signaling messages are also sent over the uplink traffic channel 506.

Figure 6:
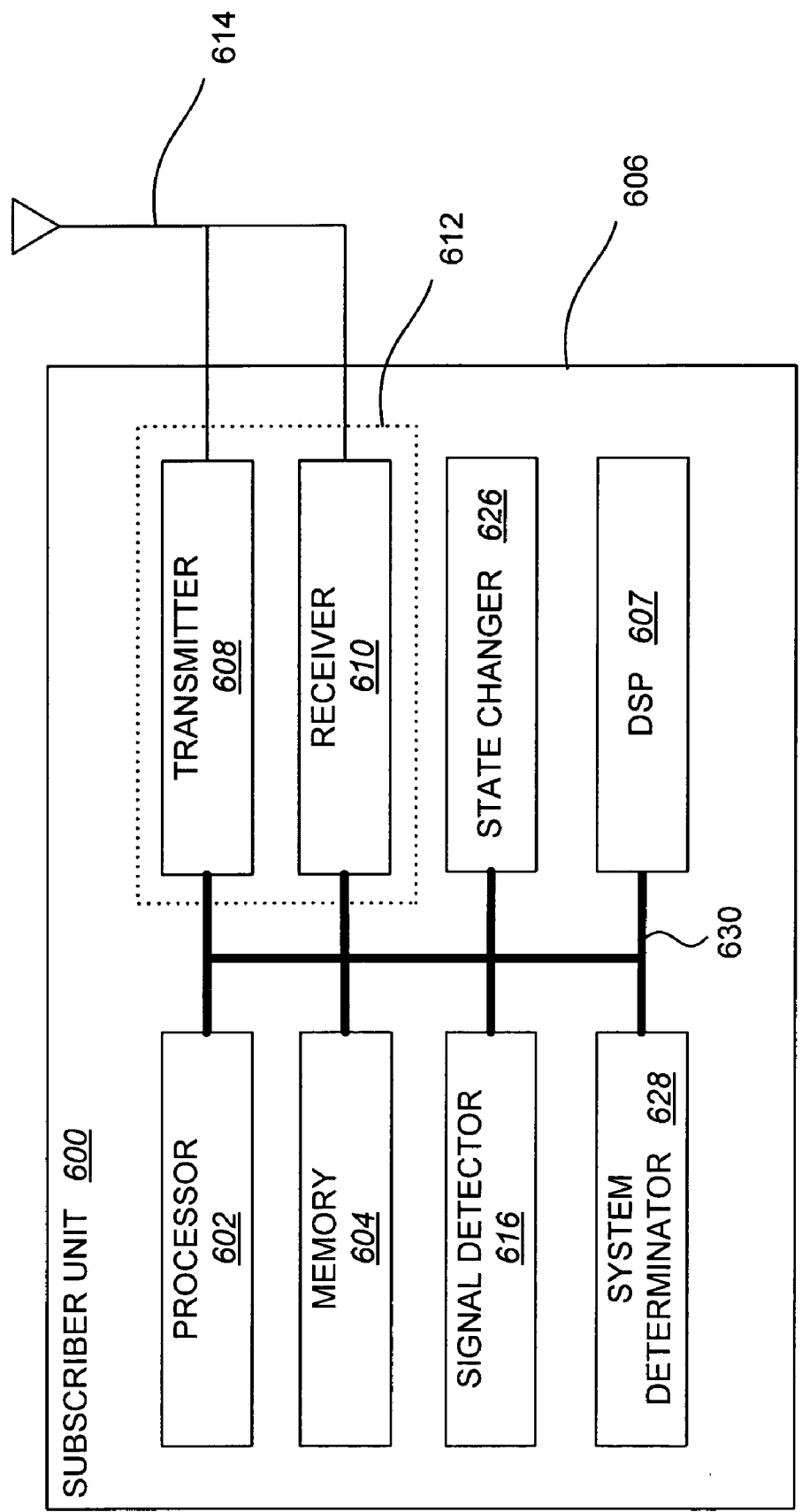
FIG. 6 is a block diagram of an embodiment of a subscriber unit.

An embodiment of a mobile station 204 is shown in a subscriber unit system 600 illustrated in the functional block diagram of FIG. 6. The system 600 includes a processor 602 which controls operation of the system 600. The processor 602 may also be referred to as a CPU. Memory 604, which may include both read-only memory (ROM) and random access memory (RAM), provides instructions and data to the processor 602. A portion of the memory 604 may also include non-volatile random access memory (NVRAM).

The system 600, which is typically embodied in a wireless communication device such as a cellular telephone, also includes a housing 606 that contains a transmitter 608 and a receiver 610 to allow transmission and reception of data, such as audio communications, between the system 600 and a remote location, such as a cell site controller or base station 202. The transmitter 608 and receiver 610 may be combined into a transceiver 612. An antenna 614 is attached to the housing 606 and electrically coupled to the transceiver 612. Additional antennas (not shown) may also be used. The operation of the transmitter 608, receiver 610 and antenna 614 is well known in the art and need not be described herein.

The system 600 also includes a signal detector 616 used to detect and quantify the level of signals received by the transceiver 612. The signal detector 616 detects such signals as total energy, pilot energy per pseudonoise (PN) chips, power spectral density, and other signals, as is known in the art.

A state changer 626 of the system 600 controls the state of the wireless communication device based on a current state and additional signals received by the transceiver 612 and detected by the signal detector 616. The wireless communication device is capable of operating in any one of a number of states.

The system 600 also includes a system determinator 628 used to control the wireless communication device and determine which service provider system the wireless communication device should transfer to when it determines the current service provider system is inadequate.

The various components of the system 600 are coupled together by a bus system 630 which may include a power bus, a control signal bus, and a status signal bus in addition to a data bus. However, for the sake of clarity, the various busses are illustrated in FIG. 6 as the bus system 630. The system 600 may also include a digital signal processor (DSP) 607 for use in processing signals. One skilled in the art will appreciate that the system 600 illustrated in FIG. 6 is a functional block diagram rather than a listing of specific components.

The methods disclosed herein for using an adaptive equalizer in a communication receiver may be implemented in an embodiment of a subscriber unit 600. The disclosed systems and methods may also be implemented in other communication systems with a receiver, such as a base station 202. If a base station 202 is being used to implement the disclosed systems and methods, the functional block diagram of FIG. 6 may also be used to describe components in a functional block diagram of a base station 202.

Figure 7:
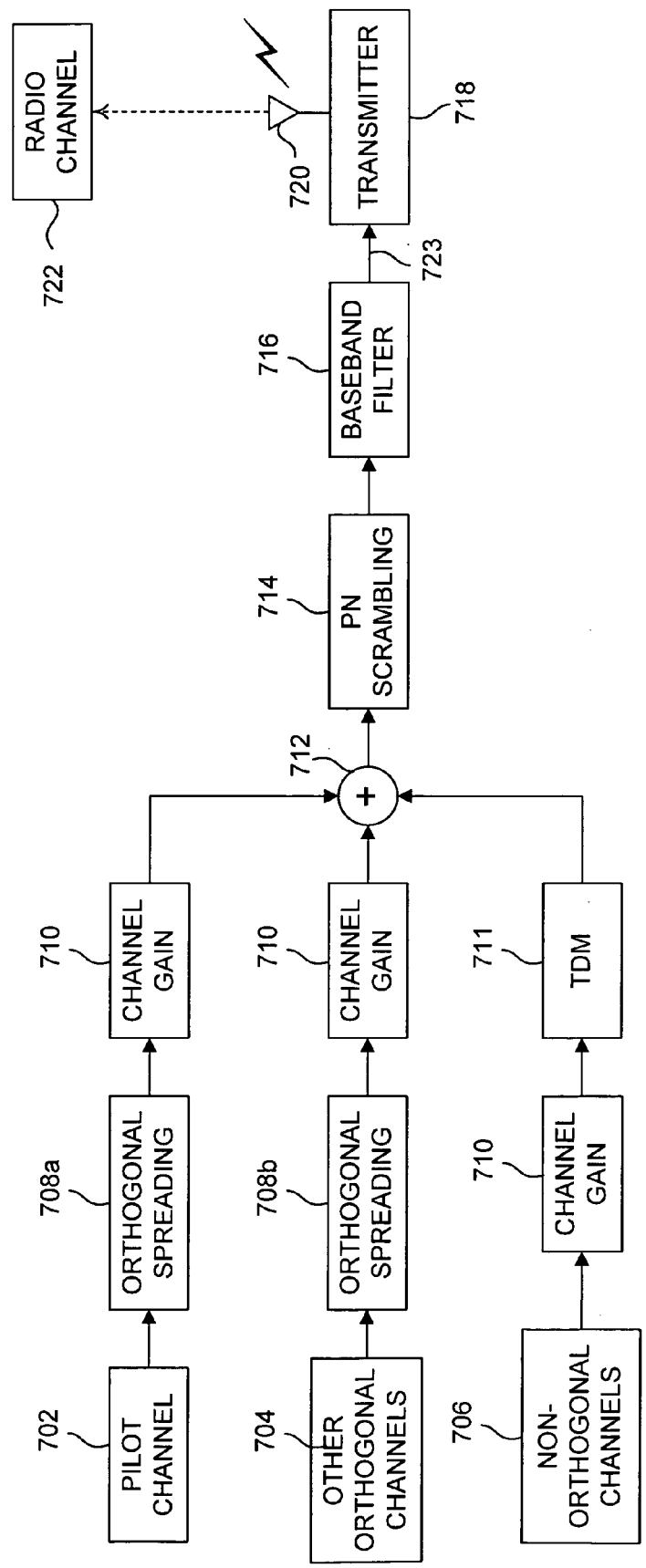
FIG. 7 is a functional block diagram illustrating the transmission of a wireless signal.

FIG. 7 is a functional block diagram illustrating the transmission of a wireless signal. As shown, the wireless signal includes a pilot channel 702 and other orthogonal channels 704. Additional non-orthogonal channels 706 may also be included in the wireless signal. Examples of non-orthogonal channels include the synchronization channel (SCH), channels scrambled by the secondary scrambling code (SSC) in WCDMA, and channels spread by quasi-orthogonal sequences (QOS) in cdma2000.

The orthogonal channels are provided to an orthogonal spreading component 708. Both the orthogonal and non-orthogonal channels are then provided to a channel gain component 710, which adds a gain for the channel. The outputs from the channel gain components 710 are summed together as shown by the summer 712. As shown in FIG. 7, the non-orthogonal channel may be time-division multiplexed (TDM) 711. In other embodiments, one or more of the orthogonal channels may be time-division multiplexed.

The non-orthogonal channels 706 do not have orthogonal spreading components. Some non-orthogonal channels 706 (e.g., the synchronization channel) may be fed directly into the channel gain component 710. Other non-orthogonal channels 706 (e.g., channels spread by quasi-orthogonal sequences in cdma2000) are spread in a non-orthogonal way and then fed into the channel gain component 710. The output of the channel gain component 710 is summed with the summer 712.

The summed signal is fed into the pseudorandom noise (PN) scrambling component 714. A baseband filter 716 takes the output from the PN scrambling component 714 and provides the filtered output 723 to a transmitter 718. The transmitter 718 includes an antenna 720. The wireless signal then enters the radio channel 722.

The functional block diagram of FIG. 7 illustrating the transmission of a wireless signal may be implemented in various components. For example, the base station 202 embodies one form of the block diagram illustrated in FIG. 7. In addition, the mobile station 204 also implements a form of the transmission block diagram.

Figure 8:
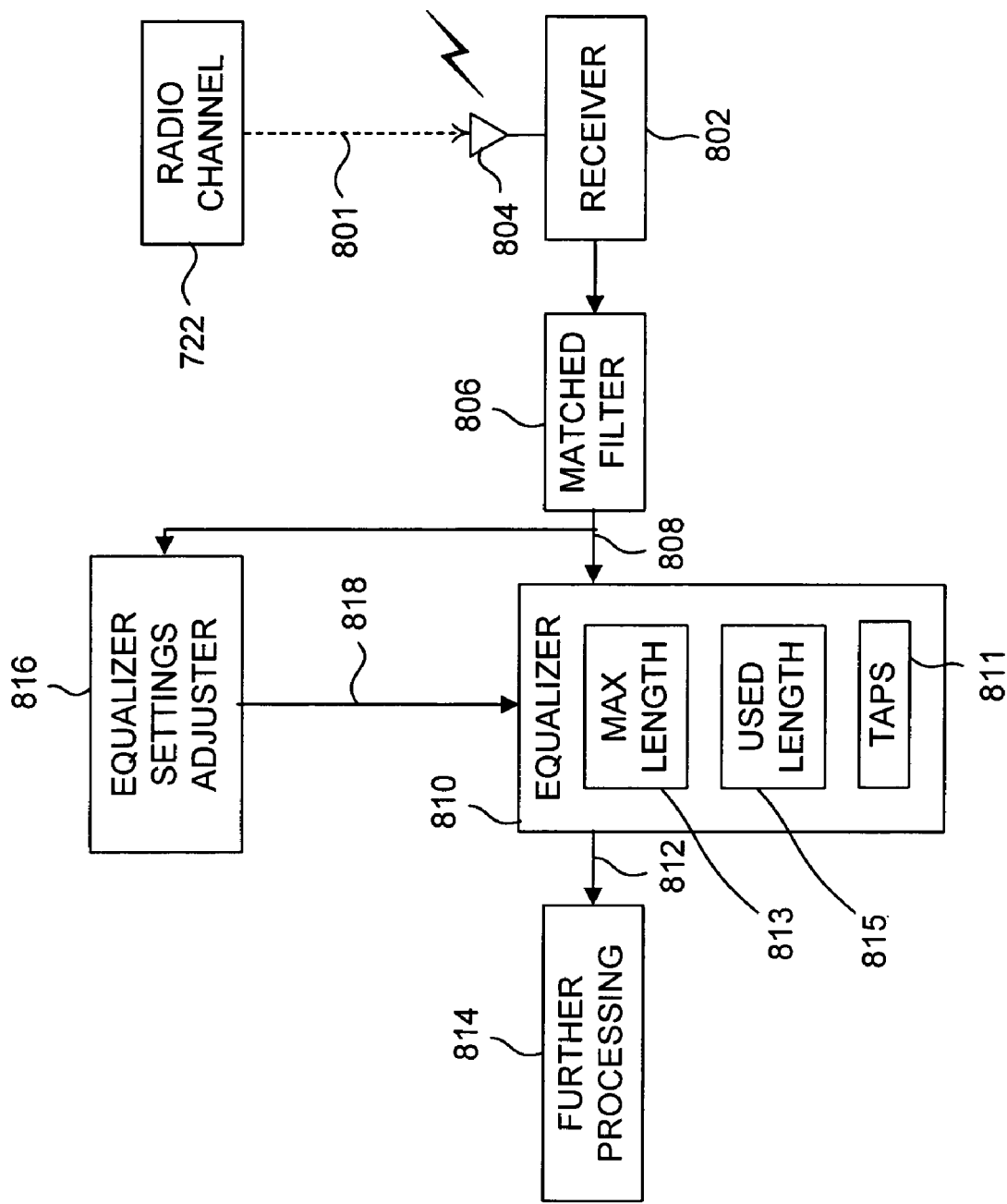
FIG. 8 is a functional block diagram illustrating the reception of a wireless signal.

FIG. 8 is a functional block diagram illustrating the reception of a wireless signal 801. A receiver 802 receives the wireless signal 801 through the use of an antenna 804. The received signal contains a distorted version of the transmitted pilot channel and other channels. The received signal is converted to baseband and fed into a matched filter 806 that is matched to the impulse response of the baseband filter in the transmitter.

The output 808 from the matched filter 806 still includes all of the different channels that were transmitted. The output 808 of the matched filter 806 is provided to an equalizer 810.

The equalizer 810 corrects for distortions and generates an estimate of the transmitted signal. The equalizer 810 also handles time-varying channel conditions. The equalizer 810 includes a filter implemented through use of a number of equalizer taps 811. The taps may be equispaced or non-equispaced with respect to the delay time. In another embodiment, equalization is performed in the frequency domain.

The equalizer 810 also has a max length 813 and a used length 815. The max length 813 is the maximum length of the filter, i.e., the maximum number of taps 811 in the equalizer 810. The used length 815 is a parameter indicating how many taps 811 are currently active or how many are currently being used. The used length 815 is less than or equal to the max length 813. As discussed below, the equalizer settings adjuster 816 determines the value for the used length 815. Typically the value for the max length 813 is fixed once the receiving system of FIG. 8 is in service.

The equalizer output 812 is provided for further processing 814. Depending on the type of signal being processed, the further processing 814 may include a variety of different components known by those skilled in the art. For example, if the signal received was a code division multiplexed (CDM) signal, the further processing may include PN descrambling (not shown), despreading (not shown) and decoding (not shown). The traffic channel may be output from the despreading component and then decoded by a decoding component (not shown). It will be appreciated by those skilled in the art that the pilot channel and the other orthogonal channels would be output from the despreading component (not shown). The various orthogonal channels may then be decoded by a decoding component (not shown).

The present systems and methods may also be used with a signal that is not a CDM signal. For example, the systems and methods disclosed herein may be used with a TDM pilot to adjust the equalizer. Other types of signals may also be used. As a result, the further processing 814 component may not include PN descrambling or orthogonal despreading as would be used with a CDM signal.

An equalizer settings adjuster 816 is used to adjust settings of the equalizer 810, as will be discussed more fully below. The equalizer settings adjuster 816 takes as input the output 808 from the matched filter and provides input 818 to the equalizer 810.

Figure 9:
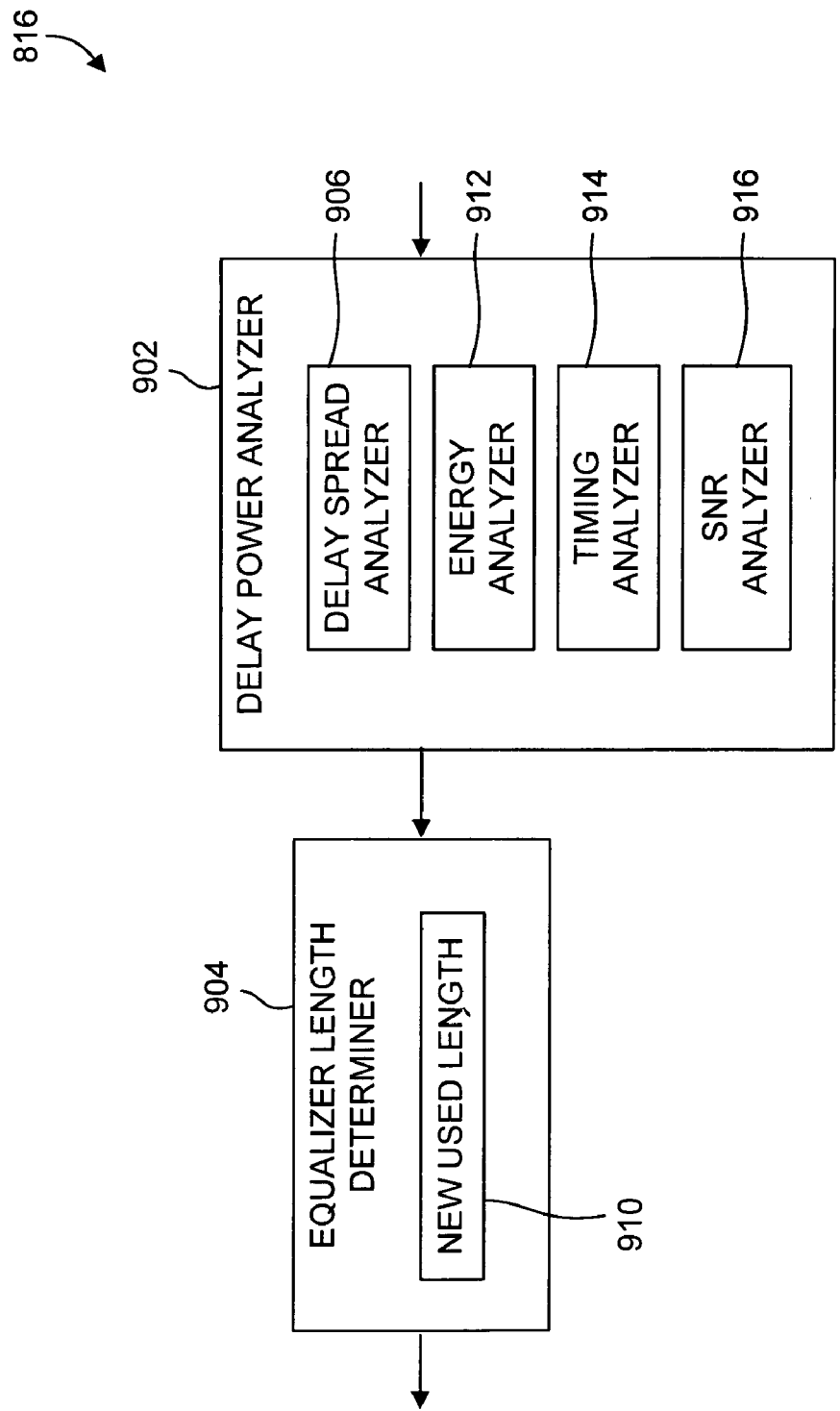
FIG. 9 is a block diagram of an embodiment of an equalizer settings adjuster.

FIG. 9 is a block diagram of an embodiment of an equalizer settings adjuster 816. The equalizer settings adjuster 816 includes a delay-power analyzer 902 and an equalizer length determiner 904. In a traditional architecture, the SNR is limited by self-interference. This limits the throughput to terminals in severe multi-path channels. One way to mitigate self-interference is to equalize the channel.

Typically, the number of equalizer taps is fixed. In the systems and methods disclosed herein, the equalizer 810 includes a variable number of taps 811. The number of taps 811 being used varies depending upon the delay spread 906 of the channel. The delay spread 906 of the channel is estimated from the delay-power analyzer 902. For purposes of this description, the delay spread 906 is the time difference between the earliest significant arriving part and the latest significant arriving part. Each analyzer is for a specific multipath component.

Consider the finger front end (not shown) of a conventional RAKE receiver. In one embodiment, a finger front end may be used to accomplish the delay-power analyzer 902. The finger front end comprises one or more fingers, as is known in the art. The finger front end provides the timing 914 and pilot SNR 916 for the strongest paths. The time difference between the earliest and latest arriving paths (τ), provides an estimate of the delay spread 906 of the channel. Let τ correspond to N chips. As a result, the expression found in Formula 1 may be formed. The term $T_c$ is the chip duration.

$$\tau = N \cdot T_c \qquad \text{Formula 1.}$$

Let the equalizer taps 811 be spaced apart by $T_c/\Omega$ and let the default number of equalizer taps 811 be denoted as M·Ω. Therefore, the equalizer time duration span is M chips (M corresponds to the max length 813 of FIG. 8). However, the actual number of taps 811 being used is set to N<M (N corresponds to the used length 815 of FIG. 8). The remaining M–N taps are set to zero and not processed in the filter (inactivated). This reduces the number of computations significantly, without affecting performance for appropriate channel conditions.

The number of non-zero taps 811 is varied according to the delay spread 906 of the channel. This number, N, could be varied once per slot to simplify the architecture. In an alternate embodiment, τ could be derived from the time of the paths with an SNR of x dB within the maximum SNR of all paths.

The delay spread 906 is estimated from the information obtained by the delay-power analyzer 902. The delay spread 906 may be based on a number of different characteristics. For example, the delay spread 906 may be energy 912 based, SNR 916 based or timing 914 based, or a combination of energy 912, SNR 916 and timing 914 based. If the delay spread 906 is energy 912 based, the energy 912 of different fingers are used to determine the delay spread 906. If the delay spread is SNR 916 based, the SNR 916 of the different fingers is used to determine the delay spread 906. Timing 914 based delay spreads 906 are based on timing values. It will be appreciated by those skilled in the art that other factors may be used to determine the delay spread 906. Further, as mentioned above, it is possible to estimate delay spread by using a finger front end. Other means may be used to estimate the delay spread. For example, the delay spread could be estimated using a set of time tracking loops for each multipath component.

The equalizer length determiner 904 uses the delay spread 906 of the channel to determine a new used length 910. The new used length 910 is used to set the value of the used length 815 in the equalizer 810.

Figure 10:
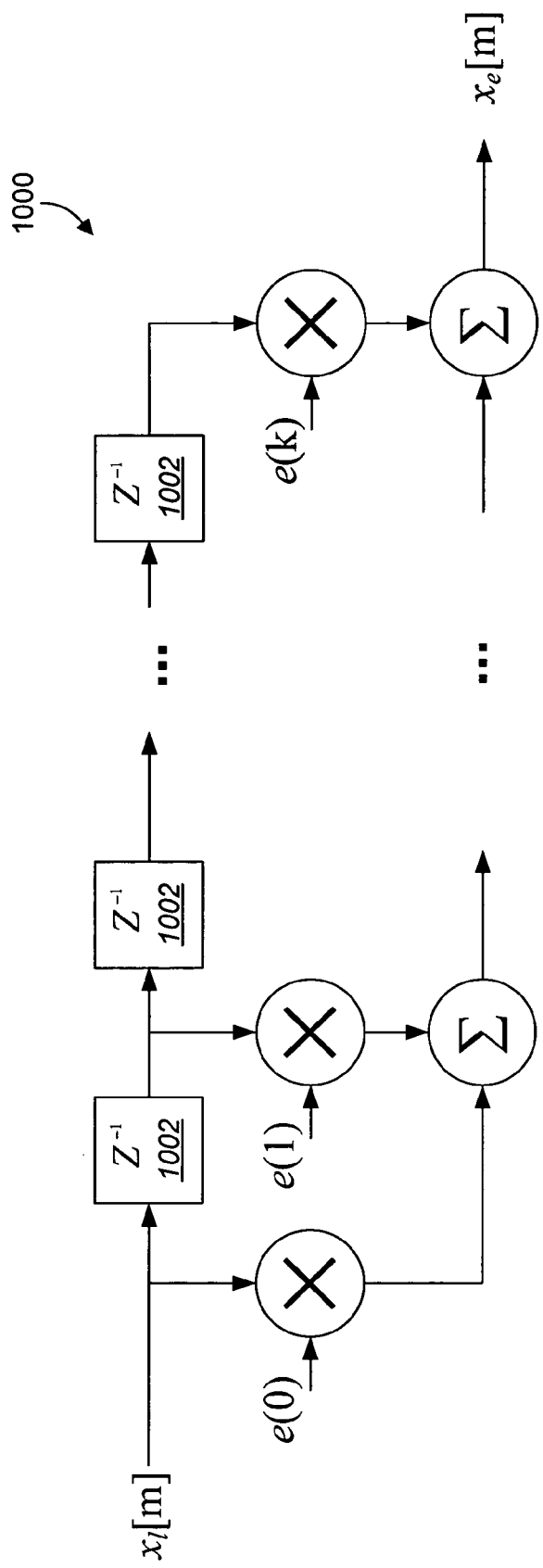
FIG. 10 is a block diagram illustrating an implementation of an FIR filter.

In one embodiment, the equalizer 810 may be implemented by a Finite Impulse Response (FIR) filter. FIG. 10 is a block diagram illustrating an implementation of an FIR filter 1000. As shown, the input to the filter is $X_I$ and the output is $X_e$. The input $X_I$ includes the present input sample as well as past samples, as indicated by the delay blocks 1002. The vector e represents the taps of the filter. The output may be calculated according to the equation shown in Formula 2. The equation of Formula 2 may be written in matrix form as shown in Formula 3.

Other components may be used within the equalizer 810 besides an FIR filter. For example, an Infinite Impulse Response (IIR) may be used. In addition, the filtering may be performed in the frequency domain.

$$x_e(m) = \sum_{k=0}^{m} e_k \cdot x_I(m-k). \qquad \text{Formula 2}$$

$$x_e[m] = X[m] \cdot e. \qquad \text{Formula 3}$$

Figure 11:
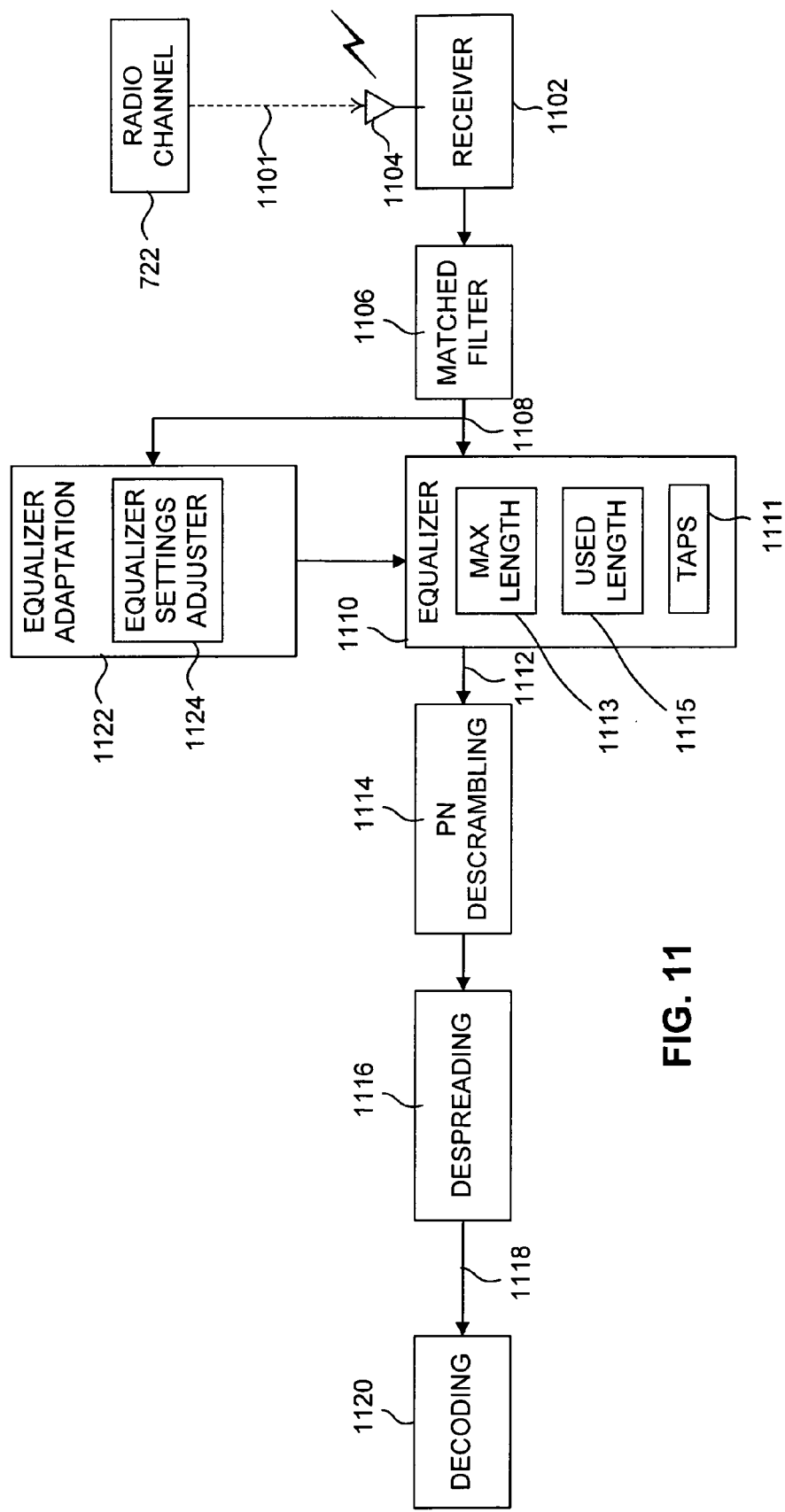
FIG. 11 is a block diagram illustrating a receiver that includes an embodiment of the equalizer settings adjuster.

Embodiments of the equalizer settings adjuster 816 may be used in various designs and implementations. For example, FIG. 11 is a functional block diagram illustrating the reception of a wireless signal 1101 that includes an equalizer adaptation component 1122. The equalizer adaptation component 1122 is disclosed in an application for patent entitled "Communication Receiver with an Adaptive Equalizer That Uses Channel Estimation" by Durga Malladi, Josef Blanz and Yongbin Wei, U.S. Application Ser. No. 10/368,891, filed on Feb. 18, 2003, assigned to the assignee hereof, and which is expressly incorporated herein by reference.

An embodiment of the equalizer settings adjuster 1124 may be incorporated within the equalizer adaptation component 1122 to adjust the number of equalizer taps 1111 being used. The equalizer adaptation component 1122 includes a delay-power analyzer, which may be used as the delay-power analyzer 902 in FIG. 9 to obtain the delay spread 906. The operation of the equalizer settings adjuster 1124 may operate as disclosed herein. The rest of the components of FIG. 11 correspond to the components of FIG. 8 and/or are disclosed in the above-referenced application. As illustrated, an equalizer output 1112 may be provided for further processing, such as in block 814 of FIG. 8. In one example, if a signal received is a code division multiplexed (CDM) signal, the further processing, such as in block 814 of FIG. 8, may include PN descrambling 1114, despreading 1116, and decoding 1120. The traffic channel may be an output 1118 from the despreading component 1116, which is then decoded by a decoding component 1120.

Figure 12:
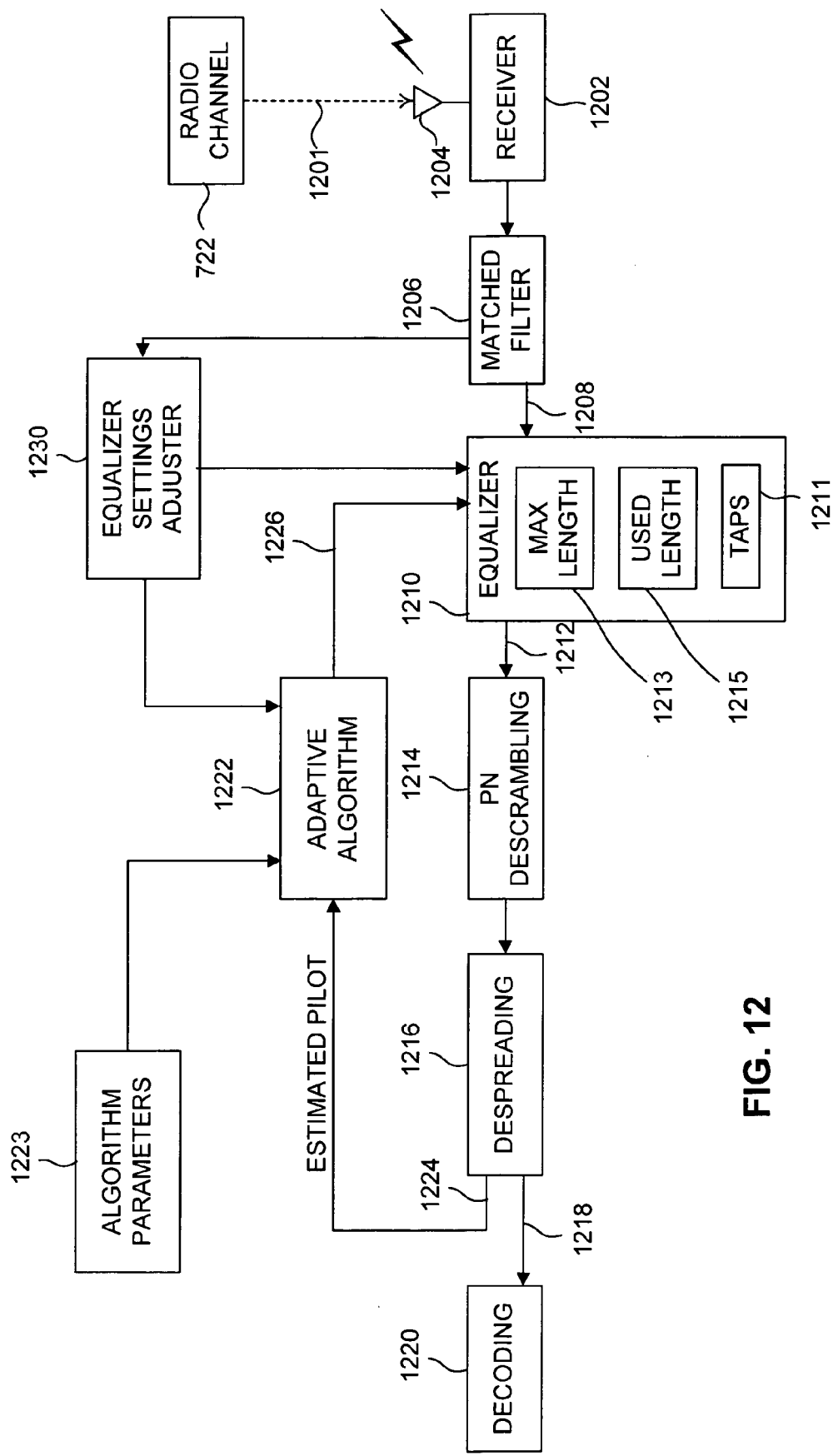
FIG. 12 is a block diagram illustrating another receiver that includes a further embodiment of the equalizer settings adjuster.

By way of further example of the equalizer settings adjuster 816 being used in various designs and implementations, FIG. 12 is a functional block diagram illustrating the reception of a wireless signal 801 that includes an adaptive algorithm 1222 for an equalizer 1210. This system is disclosed in an application for patent entitled "Communication Receiver with an Adaptive Equalizer" by Durga Malladi, Josef Blanz and Yongbin Wei, U.S. Application Ser. No. 10/368,920, filed on Feb. 18, 2003, assigned to the assignee hereof, and which is expressly incorporated herein by reference.

A further embodiment of the equalizer settings adjuster 1230 may be used in combination with the aforementioned system with an adaptive algorithm 1222 to adjust the number of equalizer taps 1211 being used. The equalizer settings adjuster 1230 may operate as disclosed herein to adjust the number of taps 1211 being used. The equalizer settings adjuster 1230 may provide its output to the equalizer 1210 and/or to the adaptive algorithm 1222 to set the number of taps 1211 being used by the equalizer 1210 filter. The rest of the components of FIG. 12 correspond to the components of FIG. 8, FIG. 11 and/or are disclosed in the relevant aforementioned application. For example, a receiver 1202 may receive a wireless signal 1201 through the use of an antenna 1204. The received signal may contain a distorted version of the transmitted pilot channel and other channels. The received signal is converted to baseband and fed into a matched filter 1206 that is matched to the impulse response of the baseband filter in the transmitter.

Figure 13:
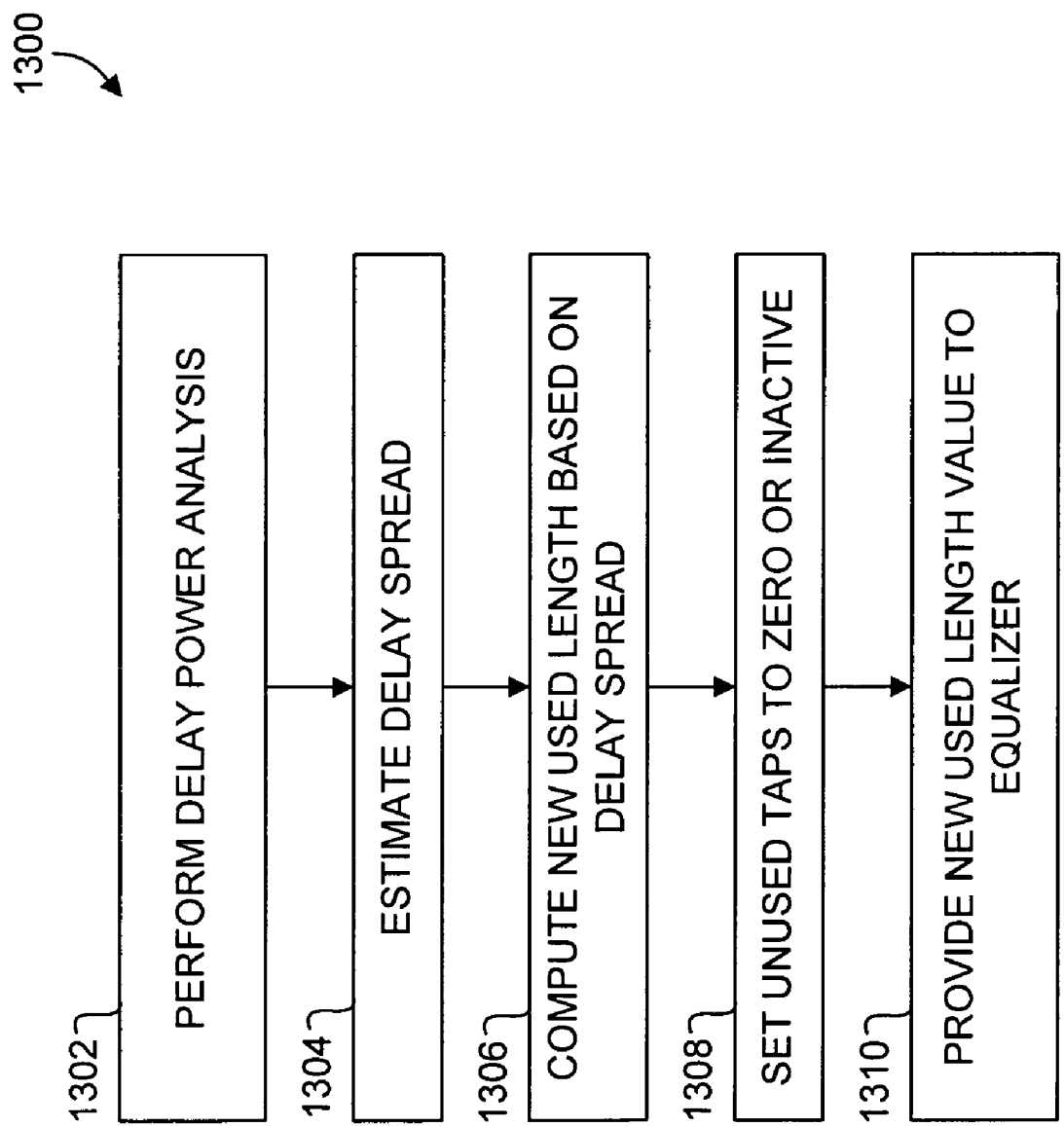
FIG. 13 is a flow diagram of a method for adaptively varying the equalizer filter length.

FIG. 13 is a flow diagram of a method 1300 for adaptively varying the equalizer filter length. The method of FIG. 13 may be used by a mobile station 204, a base station 202 and other types of receivers in a wireless communication system 100. The method 1300 includes the steps performed relating to the equalizer filter length adjusting. A delay-power analyzer 902 is used to perform 1302 delay-power analysis.

The delay spread is then estimated 1304 from the information obtained by the delay-power analyzer 902. The delay spread 906 may be based on a number of different characteristics. For example, the delay spread 906 may be energy based, SNR based or timing based. If the delay spread 906 is energy based, the energy of the different fingers may be used to determine the delay spread 906. If the delay spread is SNR based, the SNR of the different fingers may be used to determine the delay spread. Timing based delay spreads 906 are based on timing values. It will be appreciated by those skilled in the art that other factors may be used to determine the delay spread 906.

Then the new used length 910 is computed 1306 based on the delay spread. The new used length 910 is set such that the equalizer 810 may cover the necessary time delay and also so that it does not include unnecessary taps 811.

Once the new used length 910 is computed 1306, then the unneeded taps 811 may be set, step 1308, to zero or may be set as inactive (not being used). The new used length 910 may then be provided, step 1310, to the equalizer 810.

It is not necessary to update the equalizer used length 815 every pilot symbol. Different settings may be used in determining when to adapt the equalizer used length 815. For example, the method may be configured to update the equalizer used length 815 every pilot symbol interval. Alternatively, the method may be configured to adapt the equalizer length every Nth pilot symbol interval, where N is a positive integer. The value of N may be static or it may be dynamic. The method may be configured to adapt the equalizer length multiple times every pilot symbol interval. It will be appreciated by those skilled in the art that, depending on the environment, it may be necessary to adapt the equalizer length more or less frequently. For example, in low velocity situations, the equalizer may not need to be adapted and updated as often as when the system is being used in high velocity situations.

Figure 14:
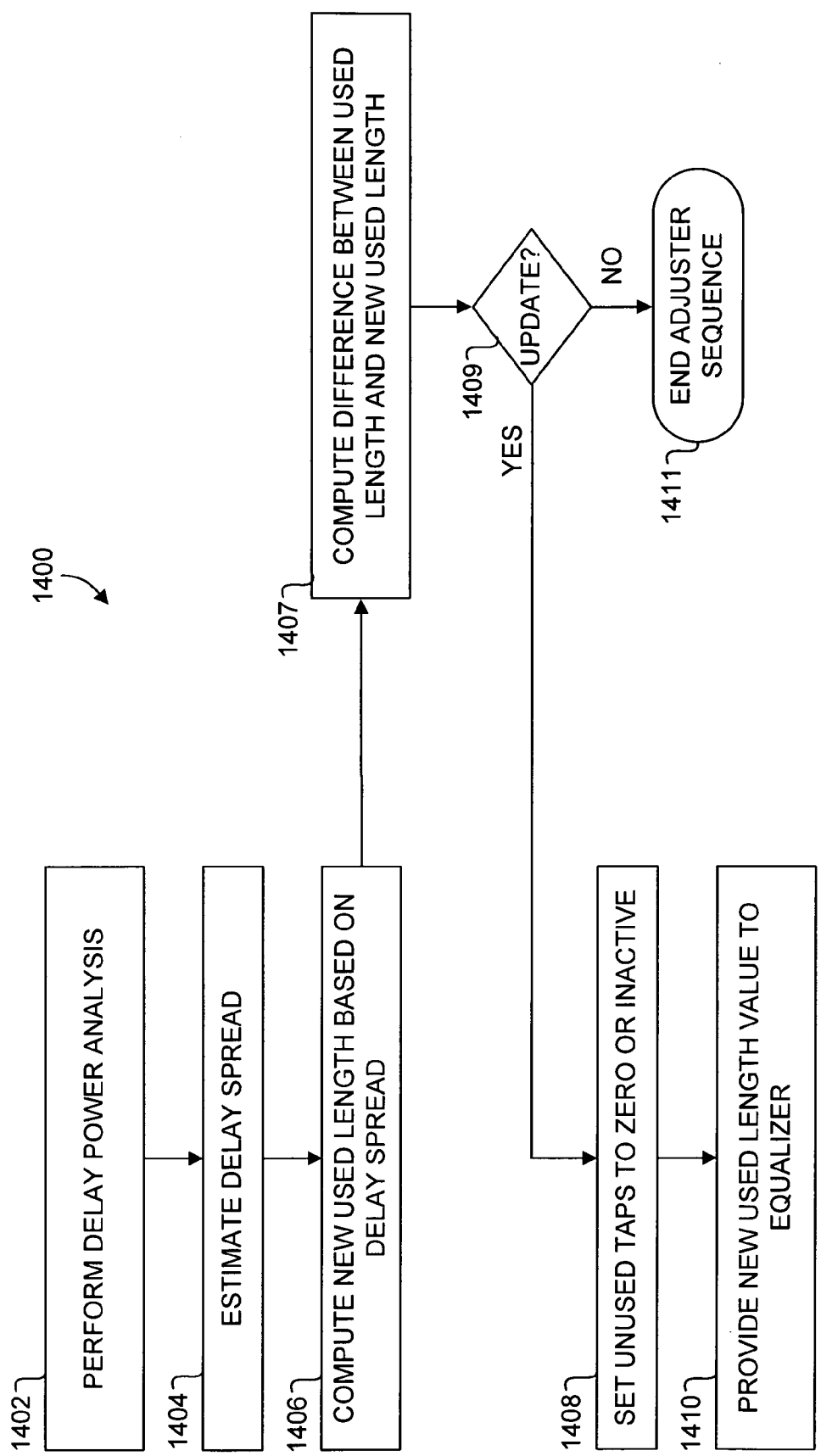
FIG. 14 is a flow diagram of a method for adaptively varying the equalizer filter length using a threshold value to update the filter length.

A threshold value may be used to determine if the equalizer length should be updated. FIG. 14 is a flow diagram of a method 1400 for adaptively varying the equalizer filter length using a threshold value to update the filter length. The method in FIG. 14 may be used when it is desireable to update the equalizer length only when at least a minimum number of taps will change. The method of FIG. 14 is similar to that of FIG. 13 except for the additional steps relating to the threshold. For example, a delay-power analyzer, such as analyzer 902 of FIG. 9, may be used to perform delay-power analysis, step 1402. A delay spread is then estimated 1404 from the information obtained by the delay-power analyzer 902. After the new used length 910 is computed 1406, the method calculates 1407 the difference between the used length 815 and the new used length 910 and compares 1409 that with a filter size update threshold (not shown). If it exceeds the threshold, then the method may continue with steps 1408 and 1410, as shown. If it does not exceed the threshold, then the equalizer adjuster sequence ends 1411 and the length is not updated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a communication system, a method for estimating a transmitted signal, the method comprising:
   receiving a communication signal;
   analyzing the communication signal using a delay-power analyzer;
   estimating a delay spread from information obtained from the delay-power analyzer;
   determining a new equalizer filter length based on the estimated delay spread; and
   configuring an equalizer to use the new equalizer filter length.

2. The method as in claim 1, wherein the equalizer comprises a filter having a maximum length and a used length, wherein the used length is less than or equal to the maximum length, and wherein the equalizer is configured to use the new equalizer filter length by setting the used length to the new equalizer filter length.

3. The method as in claim 2, further comprising computing a difference between the used length and the new equalizer filter length and wherein the equalizer is configured to use the new equalizer filter length if the difference is greater than a threshold value.

4. The method as in claim 1, wherein the communication signal comprises a wireless communication signal.

5. The method as in claim 1, wherein the delay-power analyzer computes an energy of at least two received multipath signal components.

6. The method as in claim 1, wherein the delay-power analyzer computes a delay of at least two received multipath signal components.

7. The method as in claim 1, wherein the delay-power analyzer computes a signal-to-noise ratio of at least two received multipath signal components.

8. The method as in claim 1, wherein the equalizer is an adaptive equalizer.

9. The method as in claim 1, wherein the method is implemented by a mobile station.

10. The method as in claim 1, wherein the method is implemented by a base station.

11. The method as in claim 1, wherein the method is used once every pilot symbol interval to determine the new equalizer filter length.

12. The method as in claim 1, wherein the method is used once every $N^{th}$ pilot symbol interval to determine the new equalizer filter length, where N is any positive integer.

13. The method as in claim 1, wherein the method is used N times every pilot symbol interval to determine the new equalizer filter length, where N is any positive integer.

14. A mobile station for use in a wireless communication system wherein the mobile station estimates a transmitted signal, the mobile station comprising:
   at least one antenna for receiving a wireless signal;
   a receiver in electronic communication with the at least one antenna;
   an equalizer for estimating the transmitted signal, wherein the equalizer is in electronic communication with the receiver and comprises:
      a plurality of taps;
      a maximum length defining a total number of taps; and
      a used length defining a number of taps being used, and wherein said equalizer is configured to estimate a delay spread from information obtained from a delay-power analyzer; and determine a new equalizer filter length based on the delay spread whereby the used length is adaptive.

15. The mobile station as in claim 14, wherein the used length is less than or equal to the maximum length, and wherein the equalizer is configured to use the new equalizer filter length by setting the used length to the new equalizer filter length.

16. The mobile station as in claim 14, wherein the information comprises energy-based information.

17. The mobile station as in claim 14, wherein the information comprises timing-based information.

18. The mobile station as in claim 14, wherein the information comprises signal-to-noise-ratio-based information.

19. The mobile station as in claim 14, wherein the equalizer is an adaptive equalizer.

20. The mobile station as in claim 14, wherein the equalizer is further configured to compute a difference between the used length and the new equalizer filter length and wherein the equalizer is configured to use the new equalizer filter length if the difference is greater than a threshold value.

21. An apparatus for use in a wireless communication system wherein the apparatus estimates a transmitted signal, the apparatus comprising:
   at least one antenna for receiving a wireless signal;
   a receiver in electronic communication with the at least one antenna;
   an equalizer for estimating the transmitted signal, wherein the equalizer is in electronic communication with the receiver and comprises:
      a plurality of taps;
      a maximum length defining a total number of taps; and
      a used length defining a number of taps being used, and wherein said equalizer is configured to estimate a delay spread from information obtained from a delay-spread analyzer; and determine a new equalizer filter length based on the delay spread, whereby the used length is adaptive.

22. The apparatus as in claim 21, wherein the used length is less than or equal to the maximum length, and wherein the equalizer is configured to use the new equalizer filter length by setting the used length to the new equalizer filter length.

23. The apparatus as in claim 21, wherein the information comprises energy-based information.

24. The apparatus as in claim 21, wherein the information comprises timing-based information.

25. The apparatus as in claim 21, wherein the information comprises signal-to-noise-ratio-based information.

26. The apparatus as in claim 21, wherein the equalizer is an adaptive equalizer.

27. The apparatus as in claim 21, wherein said equalizer is further configured to compute a difference between the used length and the new equalizer filter length and wherein the equalizer is configured to use the new equalizer filter length if the difference is greater than a threshold value.

28. The apparatus as in claim 21, wherein the apparatus comprises a mobile station.

29. The apparatus as in claim 21, wherein the apparatus comprises a base station.

30. A mobile station for use in a wireless communication system wherein the mobile station estimates a transmitted signal, the mobile station comprising:

means for receiving a wireless signal;
means for estimating the transmitted signal operably connected to said means for receiving, wherein the estimating means comprises:
  a plurality of taps;
  a maximum length defining a total number of taps; and
  a used length defining a number of taps being used, and wherein the used length is adaptive;
means for estimating a delay spread operably connected to said means for estimating the transmitted signal; and
means for determining a new equalizer filter length based on the delay spread, wherein said means for determining the new equalizer filter length is operably connected to said means for estimating the delay spread.

31. The mobile station as in claim 30, wherein the used length is less than or equal to the maximum length, and wherein the estimating means is configured to use the new equalizer filter length by setting the used length to the new equalizer filter length.

32. The mobile station as in claim 30, wherein the delay spread estimating means is energy-based.

33. The mobile station as in claim 30, wherein the delay spread estimating means is timing-based.

34. The mobile station as in claim 30, wherein the delay spread estimating means is signal-to-noise-ratio-based.

* * * * *